United States Patent
Park

(10) Patent No.: US 9,800,372 B2
(45) Date of Patent: Oct. 24, 2017

(54) DATA TRANSMISSION SYSTEM, ENCODING APPARATUS AND ENCODING METHOD

(71) Applicant: Hongik University Industry-Academia Cooperation Foundation, Seoul (KR)

(72) Inventor: Joon-Sang Park, Seoul (KR)

(73) Assignee: Hongik University-Academia Cooperation Foundation, Seoul (KR)

(*) Notice: Subject to any disclaimer, the term of this patent is extended or adjusted under 35 U.S.C. 154(b) by 0 days.

(21) Appl. No.: 15/056,060

(22) Filed: Feb. 29, 2016

(65) Prior Publication Data

US 2017/0117987 A1   Apr. 27, 2017

(30) Foreign Application Priority Data

Oct. 22, 2015 (KR) .......... 10-2015-0147310

(51) Int. Cl.
*H04L 1/00* (2006.01)
*H04M 7/00* (2006.01)

(52) U.S. Cl.
CPC .......... *H04L 1/0042* (2013.01); *H04L 1/0008* (2013.01); *H04M 7/006* (2013.01)

(58) Field of Classification Search
CPC ..... H04L 1/0008; H04L 1/0042; H04M 7/006
See application file for complete search history.

(56) References Cited

U.S. PATENT DOCUMENTS 6,012,159 A * 1/2000 Fischer ............ H03M 13/13
  714/755
6,421,387 B1 * 7/2002 Rhee ............... H04B 1/66
  375/240.12
2002/0071496 A1 * 6/2002 Ehrmann ......... G11B 20/1833
  375/295

(Continued)

FOREIGN PATENT DOCUMENTS

KR   2008-0041100 A   5/2008
KR   2010-0081900 A   7/2010

(Continued)

OTHER PUBLICATIONS

Office Action issued in corresponding Korean patent application No. 10-2015-0147310 dated Nov. 16, 2015.

(Continued)

*Primary Examiner* — Parth Patel
*Assistant Examiner* — Kai Chang
(74) *Attorney, Agent, or Firm* — Carter, DeLuca, Farrell & Schmidt, LLP

(57) ABSTRACT

Provided are a data transmission system, an encoding apparatus, and a decoding method. The encoding apparatus includes an encoding unit configured to use an encoding matrix to encode original packets sequentially generated from a codec to generate an encoded packet in units of a generation. The encoding unit is configured to use information provided from the codec to dynamically determine a generation boundary of the original packets to encode the original packets. The encoding unit is configured to dynamically a generation size according to a generation time of the original packets. According to embodiments of the inventive concept, it is possible to use information provided from a VoIP codec to dynamically determine the boundary or size of a generation to decrease a standby time upon encoding/decoding, and may recover the loss of packets that may occur in a wired/wireless network.

4 Claims, 3 Drawing Sheets

(56) References Cited

U.S. PATENT DOCUMENTS

| | | | |
|---|---|---|---|
| 2003/0053463 A1* | 3/2003 | Vikberg | H04L 12/5601 370/395.1 |
| 2006/0256810 A1* | 11/2006 | Yarlagadda | H04L 29/06027 370/465 |
| 2010/0115094 A1* | 5/2010 | Hagendorf | G06Q 10/00 709/226 |
| 2012/0044892 A1* | 2/2012 | Guan | H04W 72/121 370/329 |
| 2013/0148576 A1* | 6/2013 | Huang | H04W 28/20 370/328 |
| 2013/0243116 A1* | 9/2013 | Ko | H04L 5/0044 375/295 |
| 2014/0185803 A1* | 7/2014 | Lima | H04L 1/1812 380/212 |
| 2015/0033100 A1* | 1/2015 | Kim | H04L 1/0041 714/776 |

FOREIGN PATENT DOCUMENTS

| | | |
|---|---|---|
| KR | 2010-0081902 A | 7/2010 |
| KR | 2013-0126779 A | 11/2013 |
| KR | 2014-0099478 A | 8/2014 |
| KR | 2015-0019088 A | 2/2015 |
| WO | 2013-070729 A1 | 5/2013 |

OTHER PUBLICATIONS

Notice of Allowance issued in corresponding Korean patent application No. 10-2015-0147310 dated Jan. 13, 2016.

* cited by examiner

DATA TRANSMISSION SYSTEM, ENCODING APPARATUS AND ENCODING METHOD

CROSS-REFERENCE TO RELATED APPLICATIONS

This U.S. Non-Provisional patent application claims priority under 35 U.S.C. §119 of Korean Patent Application No. 10-2015-0147310, filed on Oct. 22, 2015, the entire contents of which are hereby incorporated by reference.

BACKGROUND

The present disclosure herein relates to a data transmission system, an encoding apparatus and an encoding method, and more particularly, to a data transmission system, an encoding apparatus and an encoding method that encode and transmit original packets in units of generation.

In the field of voice over internet protocol (VoIP) related to an IP based voice communication technique, packet loss significantly affects the quality of voice call. In order to decrease influence on the packet loss in the field of VoIP, a receiver side may recover a lost packet by using a forward error correction (FEC) technique generally. It is possible to apply, to the VoIP, a random linear coding (RLC) technique as another loss recovery technique different from the FEC, in which case the original packets that are generated by a VoIP codec are logically split by a transmitter in units of generation, and original packets that belong to the same generation are encoded by the RLC. In this case, the size of all generations (the number of original packets that belong to a generation) is constantly maintained. For example, Korean Patent Publication No. 10-2010-0081900 (published on Jul. 15, 2010) discloses "DATA TRANSMISSION AND RECEPTION METHOD USING RANDOM LINEAR CODING". In such a typical RLC method, encoding/decoding may be performed only when a predetermined number of packets all gather. That is, since a plurality of original packets gathers to make up a single generation and the generation becomes a unit for encoding/decoding, encoding/decoding may be performed only when all original packets that belong to a single generation gather. Thus, it is inevitable that the transmitter and the receiver have further delay times, respectively. For example, in the situation in which like VoIP traffic, packets are sequentially generated at a time interval, ten packets should gather for encoding when the size of the generation is ten, thus a further delay time occurs for which no information is transmitted to the receiver side until a tenth packet is generated after a first packet is generated. Thus, VoIP traffic has a limitation in that voice call quality decreases by the packet loss and the delay time.

SUMMARY

The present disclosure provides a data transmission system, an encoding apparatus, and an encoding method that may use information provided from a VoIP codec to dynamically determine the boundary or size of a generation to decrease a standby time upon encoding/decoding, and may recover the loss of packets that may occur in a wired/wireless network.

Tasks to be solved by the inventive concept are not limited to the above-mentioned tasks. Other tasks not mentioned could be clearly understood by a person skilled in the art to which the inventive concept pertains, from the following description.

An embodiment of the inventive concept provides an encoding apparatus including: an encoding unit configured to use an encoding matrix to encode original packets sequentially generated from a codec to generate an encoded packet in units of a generation, wherein the encoding unit is configured to use information provided from the codec to dynamically determine a generation boundary of the original packets to encode the original packets, and the encoding unit is configured to dynamically determine a generation size according to a generation time of the original packets.

In an embodiment, the encoding unit may be configured to use information provide from a voice over IP (VoIP) codec to determine the generation boundary and the generation size to encode the original packets.

In an embodiment, the encoding unit may be configured to use the information provided from the VoIP codec to determine, as the generation boundary, a section in which voice is interrupted for a set time or only sound equal to or lower than a set intensity is sensed for a set time.

In an embodiment, the encoding unit may be configured to generate encoded data that includes information corresponding to the encoded packet, the encoding matrix, a generation identifier, and a sequence number of a last original packet among the original packets used for encoding or a generation size.

In an embodiment, the encoding unit may be configured to use an encoding matrix having a matrix size corresponding to the generation size to encode the original packets.

In an embodiment, encoding vectors of the encoding matrix may have same or more zero elements as the sequence number of the last original packet and the number of zeros may decrease with an increase in sequence number of the last original packet.

In an embodiment, the encoding unit may be configured to generate the encoded data to include only elements excluding zero among elements of an encoding vector of the encoding matrix.

In an embodiment of the inventive concept, a data transmission system includes an encoding apparatus configured to use an encoding matrix to encode original packets sequentially generated from a codec to generate an encoded packet in units of a generation; and a decoding apparatus configured to receive and decode the encoded packet from the encoding apparatus to recover the original packets, wherein the encoding apparatus is configured to use information provided from the codec to dynamically determine a generation boundary of the original packets to encode the original packets to generate the encoded packet, and transmit, to the decoding apparatus, encoded data that includes information corresponding to the encoded packet, the encoding matrix, a generation identifier, and a sequence number of a last original packet among the original packets used for encoding or a generation size.

In an embodiment, the encoding apparatus may be configured to dynamically determine the generation size according to a generation time of the original packets.

In an embodiment, the encoding apparatus may be configured to use an encoding matrix having a matrix size corresponding to the generation size to encode the original packets, and encoding vectors of the encoding matrix may have same or more zero elements as the sequence number of the last original packet and the number of zeros may decrease with an increase in sequence number of the last original packet.

In an embodiment, the encoding apparatus may be configured to generate the encoded data to include only elements excluding zero among elements of an encoding vector of the encoding matrix.

In an embodiment, the decoding apparatus may be configured to receive a plurality of encoded packets corresponding to the generation size to use the plurality of encoded packets and the encoding matrix to recover the original packets.

In an embodiment, the encoding apparatus may be configured to use the information provided from a VoIP codec to determine, as the generation boundary, a section in which voice is interrupted for a set time or only sound equal to or lower than a set intensity is sensed for a set time.

In an embodiment of the inventive concept, an encoding method includes using an encoding matrix to encode original packets sequentially generated from a codec to generate an encoded packet in units of a generation, wherein the generating of the encoded packet includes using information provided from the codec to dynamically determine a generation boundary of the original packets to encode the original packets, and the generating of the encoded packet includes dynamically determining a generation size according to a generation time of the original packets.

In an embodiment, the generating of the encoded packet may include using information provided from a VoIP codec to determine, as the generation boundary, a section in which voice is interrupted for a set time or only sound equal to or lower than a set intensity is sensed for a set time, to encode the original packets.

In an embodiment, the generating of the encoded packet may include generating encoded data that includes information corresponding to the encoded packet, the encoding matrix, a generation identifier, and a sequence number of a last original packet among the original packets used for encoding or a generation size.

In an embodiment, the generating of the encoded packet may include using an encoding matrix having a matrix size corresponding to the generation size to encode the original packets, and encoding vectors of the encoding matrix may have same or more zero elements as the sequence number of the last original packet and the number of zeros may decrease with an increase in sequence number of the last original packet.

According to another aspect of the inventive concept, a computer readable non-transmission recording medium on which a program for performing the encoding method is recorded is provided.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
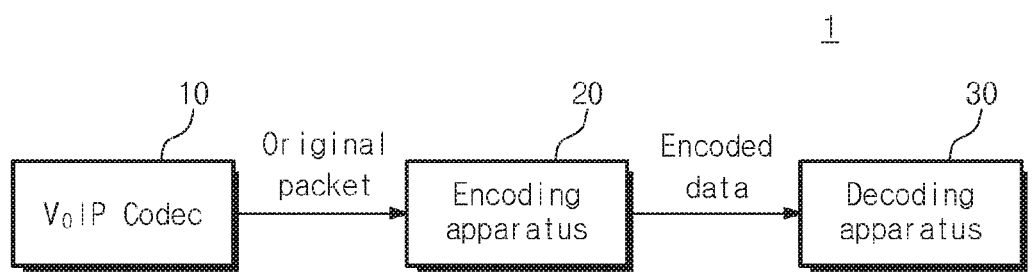
FIG. 1 is a block diagram of a data transmission system 1 according to an embodiment of the inventive concept.

Other advantages and features of the inventive concept, and implementation methods thereof will be clarified through following embodiments described in detail with reference to the accompanying drawings. However, the inventive is limited to the following embodiments and only defined by the scope of the following claims. Although some terms are not defined, all the terms used herein (including technology or science terms) have the same meanings as those generally accepted by typical technologies in the related art to which the inventive concept pertains. General descriptions of known configurations may be left out in order not to obscure the subject matter of the inventive concept. In the accompanying drawings of the inventive concept, like reference numerals are used for like components if possible. In order to help the understanding of the inventive concept, some components in the accompanying drawings may be exaggerated or reduced.

The terms used herein are only used to describe specific embodiments and not intended to limit the inventive concept. The terms in singular form include the plural form unless otherwise specified. It should be understood that the terms "includes" or "has" indicate the presence of characteristics, numbers, steps, operations, components, parts or combinations thereof represented in the present disclosure but do not exclude the presence or addition of one or more other characteristics, numbers, steps, operations, components, parts or combinations thereof.

The term "~unit" used herein is a unit for processing at least one function or operation and may mean e.g., software or hardware components, such as FPGA or ASIC. However, the term "~unit" is not limited to the software or the hardware. The term "~unit" may be configured in an addressable storage medium or may be configured to operate one or more processors.

As an example, the term "~unit" includes components such as software components, object-oriented software components, class components, and task components; processes, functions, attributes, procedures, sub routines, program code segments, drivers, firmware, micro codes, circuits, data, DBs, data structures, tables, arrays and variables. Functions that are provided by the component and the "~unit" may be performed independently by a plurality of components and "~units" or also be integrated into further components.

An encoding apparatus according to an embodiment of the inventive concept uses information provided from a codec, such as a voice over IP (VoIP) codec to dynamically determine the generation boundary of original packets that are sequentially generated from the codec, to encode original packets that belong to a generation. According to the present embodiment, since the generation boundary and a generation size are dynamically set for encoding without awaiting until a predetermined number of original packets are generated by the codec, it is possible to reduce delay times at data transmitter and receiver sides and recover the loss of packets that may occur in a wired/wireless network, such as a VoIP network to enhance data transmission quality.

FIG. 1 is a block diagram of a data transmission system 1 according to an embodiment of the inventive concept. In the following, the data transmission system 1 according to the present embodiment is described with an example where voice data is transmitted from a transmitter to a receiver by a VoIP technique that is an IP based voice communication technique. However, it is noted that the data transmission system 1 according to the present embodiment is not limited to VoIP based voice data transmission.

Referring to FIG. 1, the data transmission system 1 includes a VoIP codec 10, an encoding apparatus 20, and a decoding apparatus 30. The VoIP codec 10 and the encoding apparatus 20 may be provided to a terminal at a transmitter side and the decoding apparatus 30 may be provided to a terminal at a receiver side. A series of original packets that correspond to voice data at the transmitter side are sequentially generated by the VoIP codec 10.

The encoding apparatus 20 encodes the original packets that are sequentially generated by the codec, by using an encoding matrix to generate encoded packets in units of a generation. The encoding apparatus 20 transmits the encoded packets that are generated by encoding, and the encoded data that includes the encoding matrix. The decoding apparatus 30 decodes the encoded packet received from the encoding apparatus 20 by using the encoding matrix to recover the original packets.

Figure 2:
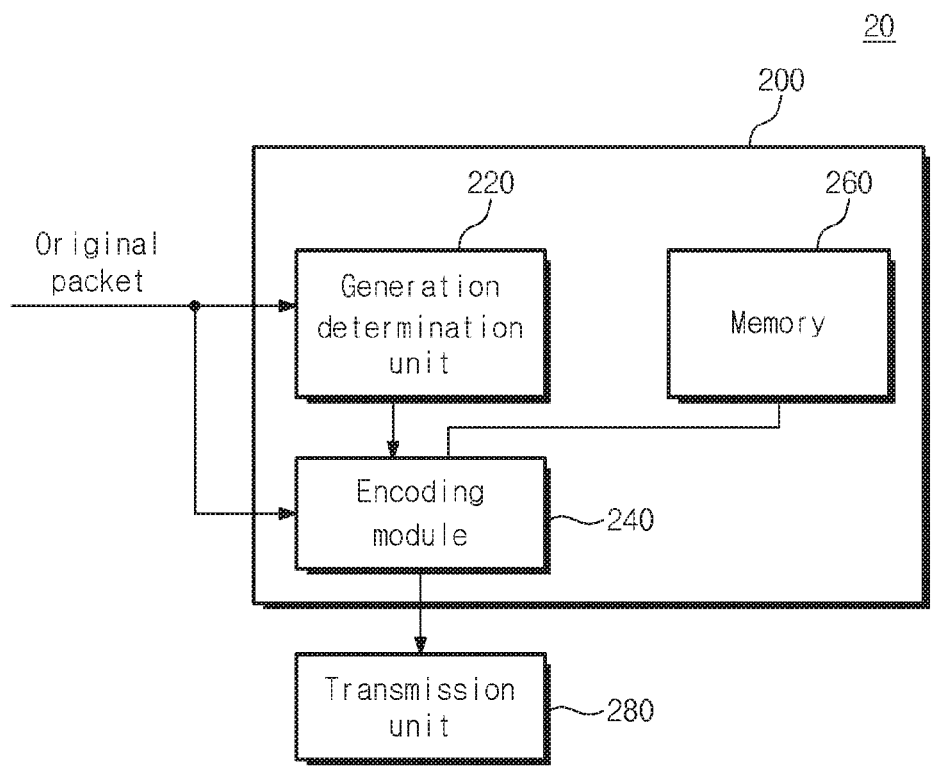
FIG. 2 is a block diagram of an encoding apparatus 20 according to an embodiment of the inventive concept.

FIG. 2 is a block diagram of the encoding apparatus 20 according to an embodiment of the inventive concept. Referring to FIGS. 1 and 2, the encoding apparatus 20 may include an encoding unit 200 and a transmission unit 280. In the present embodiment, the encoding unit 200 dynamically determines the boundary of a generation that is the unit of encoding, and the size of the generation that is the number of original packets to be encoded, to encode the original packets by using an encoding matrix to generate an encoded packet in units of the generation. To this end, the encoding unit 200 may include a generation determination unit 220, an encoding module 240, and a memory 260.

Figure 3:
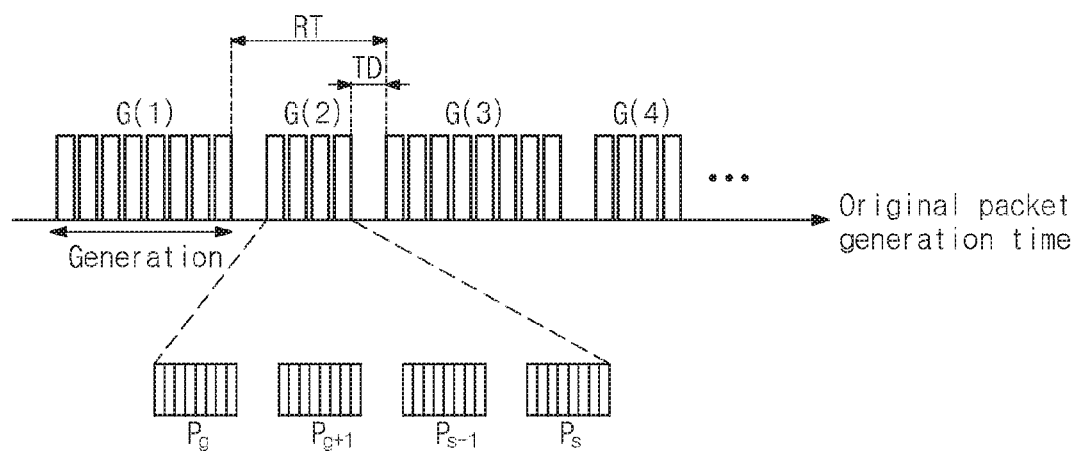
FIG. 3 represents original packets in order to explain the operations of an encoding unit that configures an encoding apparatus according to an embodiment of the inventive concept.

The generation determination unit 220 uses information provided from the VoIP codec 10 to variably set the generation boundary and the generation size. FIG. 3 represents original packets in order to explain the operations of an encoding unit that configures an encoding apparatus according to an embodiment of the inventive concept. Referring to FIGS. 2 and 3, the generation determination unit 220 may dynamically determine the generation boundary and the generation size according to the generation time of original packets, as an embodiment.

As an example, when user voice is interrupted for a set time or only sound equal to or lower a set intensity is sensed for a set time, the generation determination unit 220 may use the information provided from the VoIP codec to receive the fact and set the generation boundary. If a preset reference time range RT has no section in which voice is interrupted or only sound equal to or lower than a predetermined intensity is sensed, the number of original packets that are generated within the reference time range RT may be determined as the generation size and the original packets may be encoded.

If the generation boundary is determined by the generation determination unit 220, the number of original packets that are generated before the generation boundary may be determined as the generation size and corresponding original packets may be encoded by the encoding module 240. FIG. 3 shows four generations G(1), G(2), G(3), and G(4) and the sizes of these generations are 8, 4, 8, and 4, respectively. However, it is an example and the size of the generation may vary.

Although in FIG. 3, the number of original packets that are generated from after the last original packet of the previous generation G(1) is generated to before the generation boundary within the reference time range RT is determined as the generation size, it is also possible to determine, as the generation size, the number of original packets that are generated from after the first original packet of a corresponding generation G(2) is generated to before the generation boundary within the reference time range RT.

As another example, in the case where the preset reference time range RT has not elapsed but the next original packet is not generated within a reference delay time range TD, the generation determination unit 220 may also determine, as the generation size, the number of original packets previously generated within the reference time range RT to perform encoding. As another example, when voice interruption is sensed from the VoIP codec 10 or only sound equal to or lower a predetermined intensity is sensed, information informing the generation boundary is delivered, and the generation determination unit 220 may also determine the generation boundary according to the information provided from the VoIP codec 10.

Figure 4:
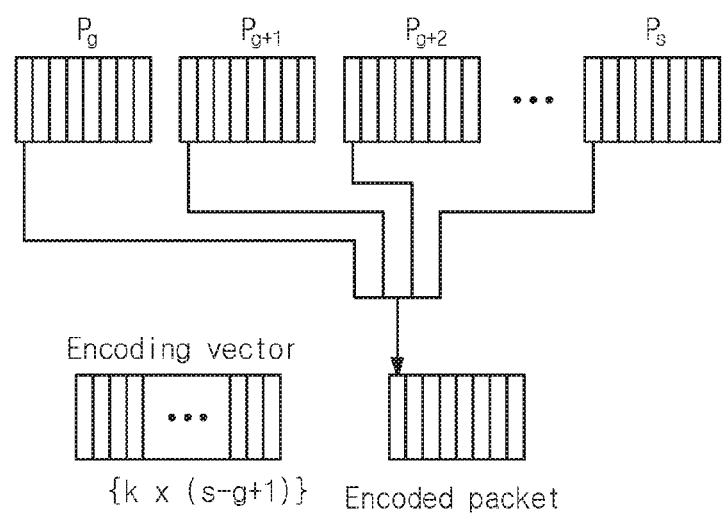
FIG. 4 is diagram for explaining an encoding method of an encoding apparatus according to an embodiment of the inventive concept.

As such, the generation determination unit 220 may variably set the generation boundary and the generation size to encode the original packets so that it is possible to reduce a standby time for encoding/decoding at a transmitter side and a receiver side and enhance voice call quality. FIG. 4 is diagram for explaining an encoding method of an encoding apparatus according to an embodiment of the inventive concept. Referring to FIGS. 2 to 4, the encoding module 240 generates an encoding matrix having a matrix size corresponding to the generation size determined according to the generation boundary determined by the generation determination unit 220, and uses the encoding matrix to encode original packets.

Since in the case of e.g., the first generation G(1) in FIG. 3, the generation size is 8, the encoding module 240 may generate a k×8 (k≥8) encoding matrix having elements arbitrarily selected from any finite field and use the k×8 encoding matrix to encode 8 original packets to generate k encoded packets. In this case, the generation time of each encoded packet may be different. The encoding vectors of the encoding matrix have the same or more zero elements as the sequence number of the last of original packets to be encoded, and the number of zeros may decrease with an increase in sequence number of the last original packet. An example of the encoding matrix is as follows:

$$\begin{bmatrix} e_1^{(1)} & 0 & \cdots & 0 \\ e_1^{(2)} & e_2^{(2)} & \cdots & 0 \\ \vdots & & \ddots & 0 \\ e_1^{(k)} & e_2^{(k)} & \cdots & e_{s-g+1}^{(k)} \end{bmatrix}.$$

In an embodiment, the encoding matrix has k encoding vectors, first to mth columns of an mth encoding vector (1≤m≤k) have non-zero elements, and (m+1)th to (s−g+1)th columns may have zero elements.

As another example, since in the case of e.g., the second generation G(2) in FIG. 3, the generation size is 4, the encoding module 240 may randomly generate an n×4 (n≥4) encoding matrix having elements and use the n×4 encoding matrix to encode 4 original packets to generate k encoded packets.

Generally speaking, when the first of original packets that belong to the same generation is referred to $p_g$ and the last original packet is referred to as $p_s$, the generation size becomes s−g+1. Thus, the encoding module 240 may generate a k×(s−g+1) encoding matrix to encode s−g+1 original packets so that it is possible to generate k(≥s−g+1)) encoded packets.

Figure 5:
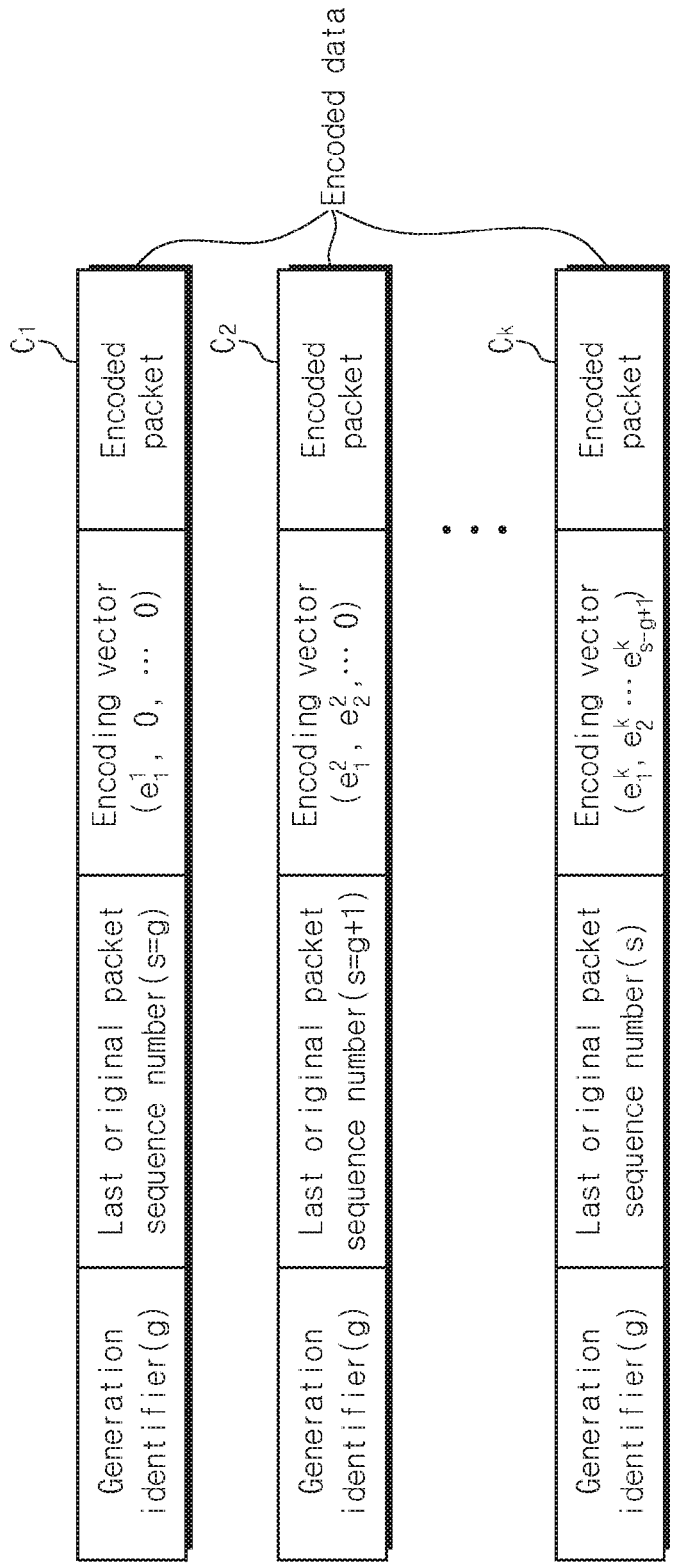
FIG. 5 shows an example of encoded data according to an embodiment of the inventive concept.

FIG. 5 shows an example of encoded data according to an embodiment of the inventive concept. Referring to FIGS. 2 to 5, the encoding module 240 may generate encoded data that includes information corresponding to encoded packets $c_1, c_2, \ldots, c_k$, encoding matrixes $e^1_1, \ldots, e^k_{s-g+1}$, a generation identifier g, the sequence number s(≥g) of the last of original packets to be encoded, or a generation size. Pieces of encoded data that are generated original packets belonging to the same generation have the same generation identifier. In each piece of encoded data, the sequence number s of the last original packet may be different from each other. That is, the sequence number of the last original packet of (l+1)th (1≤l≤k−1) encoded data may be larger (increase by e.g., 1) than or equal to the sequence number of the last original packet of lth encoded data.

Although in an example in FIG. 5, the sequence number g of the first original packet belonging to a generation is used as a generation identifier, it is also possible to use another identifier for identifying a generation. Although in FIG. 5, the sequence number s of the last original packet is included in encoded data, other information such as a generation size s−g+1 may also be included in the encoded data.

Referring back to FIGS. 1 and 5, the memory 260 may store information needed for encoding, e.g., original packets, programs for executing the encoding of the original packets, encoded packets, encoding matrixes, generation identifiers, and generation sizes. The transmission unit 280 is provided in order to transmit encoded data to the decoding apparatus 30 through a wired/wireless communication network. The transmission of zero elements among elements of an encoding vector of the encoding matrix in the encoded data may be omitted. That is, the encoding apparatus 20 may generate encoded data so that only elements excluding zero among elements of the encoding vector of the encoding matrix are included, and transmit the generated data to the decoding apparatus 30.

The decoding apparatus 30 may receive the encoded data transmitted from the encoding apparatus 20, receive a generation identifier and a plurality of encoded packets corresponding to the sequence number of the last original packet, and use the plurality of encoded packets and the encoding matrix to recover original packets by Gauss Jordan Elimination.

In the following, an encoding method according to an embodiment of the inventive concept is described with VoIP that is an IP based voice communication technique, as an example. However, the encoding method according to the present embodiment is not limited to VoIP based voice data transmission. The encoding method according to the present embodiment may be performed by the above-described encoding apparatus.

In the VoIP technology, a real time protocol (RTP) is being used for voice data transmission. In a typical encoding method, the sizes of all generations are equally maintained as n, and in a state in which the number of packets belonging to each generation is equally maintained, the process of generating, by RLC, a linear combination of all packets belonging to a specific generation is performed. In a typical RLC method, encoding is performed by using n packets belonging to a specific generation as represented in Equation 1 below:

$$c = \sum_{k=1}^{n} e_k p_k. \quad (1)$$

In Equation 1 above, n denotes a generation size, and each $e_k$ (k=1, 2, ..., n) denotes a value that is arbitrarily selected from a finite field. An encoding matrix $e=[e_1, \ldots, e_n]$ is included in the header of the encoded packet c so that n or more different encoded packets are generated and transmitted to a receiver side. In such a typical RLC method, encoding/decoding may be performed only when packets equal to or more than a predetermined number gather. That is, since in a typical RLC method, a plurality of original packets gathers to make up a single generation and the generation becomes a unit for encoding/decoding, encoding/decoding may be performed only when all original packets that belong to a single generation gather. Thus, it is inevitable that a transmitter and a receiver have further delay times, respectively. Since in the case of VoIP traffic, a delay time significantly affects quality, there is a need to minimize the delay time.

An embodiment of the inventive concept to be described below relates to an encoding method that may reduce the delay time upon encoding/decoding by a transmitter and a receiver. Original packets that the VoIP codec of the transmitter generate are referred to as $p_1, p_2, p_3, \ldots$. The subscripts of the original packets $p_1, p_2$, and $p_3$ are sequence numbers (serial numbers) or packet identifiers that represent the generation sequence of each original packet and may be referred to as e.g., unique and continuous numbers that are positive integers. In the case where the transmitter and the receiver agree on a separate sequence number, the sequence numbers may also be discontinuously assigned.

These original packets are logically split in units of generation. All original packets $p_k$ (k=1, 2, ...) belong to a specific generation and the specific generation is a set of original packets that has adjacent sequence numbers. As an example, a generation identifier for identifying a generation may be set to the smallest value among the sequence numbers of original packets that belong to a corresponding generation. For example, original packets $p_1, p_2$, and $p_3$ may belong to the first generation and original packets $p_4, p_5$, and $p_6$ may belong to the fourth generation. Although unique, continuous, positive values are used as the identifiers (sequence numbers) of original packets, unique positive but discontinuous integers may be used as generation identifiers.

The encoding method according to the present embodiment determines the generation of a specific original packet dynamically, not according to a predetermined method. That is, when logically splitting original packets in units of generation, a generation to which a specific original packet $p_k$ belongs is determined according to the generation time of the original packet $p_k$.

For example, in the case where the first original packet belonging to a generation to be newly encoded is $p_g$, original packets subsequently generated by the VoIP codec are determined as the same generation and it is possible to assign the identifier s of the first original packet to the identifier of a corresponding generation.

If whether to change a generation by a specific method is determined between the generation time of an original packet $p_s$ and the generation time of an original packet $p_{s+1}$, original packets $p_g, p_{g+1}, \ldots, p_s$ are determined as corresponding to a generation that has a generation identifier s. Thus, the original packet $p_{s+1}$ becomes the first original packet of the next generation and the identifier of the next generation is determined as s+1.

The change of the generation may be determined by various methods. As an example, when voice interruption is sensed from the VoIP codec 10 or only sound equal to or lower a predetermined intensity is sensed, information informing a generation boundary is delivered and the generation boundary may be correspondingly determined. Also, when an original packet $p_{s+1}$ is generated from the VoIP codec after a preset reference time range than the original packet $p_g$, a generation may be changed, or when the original packet $p_{s+1}$ is generated from the VoIP codec after a preset reference delay time range than the original packet $p_s$, a generation may be changed.

As another example, the change of the generation may also be performed according to a request signal transmitted from a receiver side. For example, in the case where there is a need to receive original packets according to the decoding situation of the receiver side, a generation change request may be received from the receiver side and the generation boundary may also be determined according to the request signal from the receiver side.

Thus, each generation according to the present embodiment may be different in size. When a set of all generation numbers is referred to as G, G(h) denotes the identifier of an hth generation, and M(G(h)) denotes the size of an hth generation, G(h+1) may be determined so that G(h+1)=G(h)+M(G(h)) for all hs. For example, if the identifier of the first generation 1 and the size of the first generation 4, the identifier of the second generation may be determined to satisfy G(2)=G(1)+M(G(1))=1+4=5.

When a series of continuous original packets $p_s$ are generated by a VoIP application program and delivered to the encoding unit, the encoding unit sets, as a generation identifier, the value g determined by the generation determination method for each $p_s$, uses original packets stored in storage and having the same generation identifier to generate one or more encoded packets $c_{(g,s)}$ by using the following equation, and transmits the generated packet to the receiver side:

$$c_{(g,s)} = \sum_{k=1}^{s-g+1} e_k p_{k+g-1}. \quad (2)$$

In Equation 2, each $e_k$ denotes any value belonging to a finite field, g denotes a generation identifier, and s denotes the sequence number of the last original packet, i.e., the largest of the sequence numbers that are used to generate the packet $c_{(g,s)}$. When the packet $c_{(g,s)}$ is transmitted to the receiver side, the generation identifier g and the sequence number s of the last original packet are together transmitted, and the encoding matrix $e=[e_1, \ldots, e_{s-g+1}]$ is also transmitted together with the encoded packet. Since $e_k$ in Equation 2 above is any value, one or more encoded packets $c_{(g,s)}$ becomes different encoded packets. In order for the receiver side to perform decoding, the number of encoded packets that is generated and transmitted for a specific generation needs to be larger than the generation size M(g).

If the identifiers of original packets are discontinuous, the identifiers may be represented by f(k), k=1, 2, . . . and f(k) has a positive integer to satisfy f(k)<f(k+1) for all ks, it is possible to represent, by $p_{f(k)}$ (k=1, 2, . . .), original packets that are generated by a VoIP application. In this case, k denotes the generation sequence of an original packet. For example, the original packet that is firstly generated may be represented by $p_{f(1)}$, the original packet that is secondly generated may be represented by $p_{f(2)}$, and the original packet that is thirdly generated may be represented by $p_{f(3)}$.

Thus, when in the above-described encoding method, $p_k$ is replaced $p_{f(k)}$, it is possible to perform coding on when the identifiers of original packets are discontinuous. The encoding method according to the present embodiment as described above may adaptively adjust a generation boundary and a generation size according to the situation to perform encoding/decoding without awaiting until all of a predetermined number of packets are generated or received, thus it is possible to significantly reduce a delay time upon encoding/decoding. Also, in the case of VoIP, the loss of a packet significantly affects voice call quality, but according to the present embodiment, since it is possible to recover generated packets by the VoIP codec even when some packets are lost, it is possible to recover the loss of VoIP packets that may occur in a wired/wireless network.

The encoding method according to the embodiment of the inventive concept may be written as e.g., a program that may be executed on the computer, and implemented by a general-purpose digital computer that operates the program by using a computer readable recording medium. The program for performing the encoding method according to the present embodiment may be executed by at least one processor. The computer readable recording medium may be a volatile memory, such as a static RAM (SRAM), a dynamic RAM (DRAM), a synchronous DRAM (SDRAM), etc. or a non-volatile memory, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a Ferroelectric RAM (FRAM), a storage medium, such as a floppy disk, a hard disk or an optical reading medium, such as CD ROM, DVD, etc. but is not limited thereto.

The embodiments of the inventive concept provides a data transmission system, an encoding apparatus, and an encoding method that may use information provided from a VoIP codec to dynamically determine the boundary or size of a generation to decrease a standby time upon encoding/decoding, and may recover the loss of packets that may occur in a wired/wireless network.

The effects of the inventive concept are not limited to the above-described effects. Effects not mentioned could be clearly understood by a person skilled in the art to which the inventive concept pertains, from the present disclosure and the accompanying drawings.

Since the above embodiments are presented to help the understanding of the inventive concept, it should be understood that they do not limit the scope of the inventive concept and various variations thereto also belong to the scope of the inventive concept. The technical protective scope of the inventive concept should be defined by the technical spirit of the following claims and it should be understood that the technical protective scope of the inventive concept is not limited to the wording of the claims but actually reaches inventions having equivalent technical values.

What is claimed is:

1. An encoding apparatus comprising:
   a memory storing original packets, and programs for encoding of the original packets, and
   at least one processor in communication with the memory, the at least one processor being configured to:

encode the original packets sequentially generated from a codec using an encoding matrix to generate an encoded packet in units of a generation;

use information provided from the codec to dynamically determine a generation size according to a generation time of the original packets and to dynamically determine a generation boundary of the original packets to encode the original packets; and generate the encoding matrix having a matrix size corresponding to the generation size dynamically determined according to the generation time of the original packets, wherein encoding is performed on the original packets that belong to the same generation having the generation size, wherein the generation boundary, the generation size and the matrix size are variable according to a voice interruption from a voice over IP (VoIP) codec, wherein the at least one processor is configured to generate encoded data that comprises information corresponding to the encoded packet, the encoding matrix, a generation identifier for identifying the generation, and a sequence number of a last original packet among the original packets that belong to the same generation, the generation identifier being set to the smallest value among the sequence numbers of original packets that belong to the same generation, and wherein the at least one processor is configured to generate the encoded data to comprise only elements excluding zero among elements of an encoding vector of the encoding matrix.

2. The encoding apparatus of claim 1, wherein the at least one processor is configured to use the information provided from the voice over IP (VoIP) codec to determine the generation boundary and the generation size to encode the original packets.

3. The encoding apparatus of claim 2, wherein the at least one processor is configured to use the information provided from the VoIP codec to determine, as the generation boundary, a section in which voice is interrupted for a set time or only sound equal to or lower than a set intensity is sensed for a set time.

4. The encoding apparatus of claim 1, wherein encoding vectors of the encoding matrix have same or more zero elements as the sequence number of the last original packet and the number of zeros decreases with an increase in sequence number of the last original packet.

* * * * *